United States Patent
Beaudoin (10) Patent No.: US 9,443,297 B2
(45) Date of Patent: Sep. 13, 2016

(54) SYSTEM AND METHOD FOR SELECTIVE DETERMINATION OF POINT CLOUDS

(71) Applicant: Cognex Corporation, Natick, MA (US)

(72) Inventor: Robert Emile Beaudoin, Cambridge, MA (US)

(73) Assignee: Cognex Corporation, Natick, MA (US)

( * ) Notice: Subject to any disclaimer, the term of this patent is extended or adjusted under 35 U.S.C. 154(b) by 328 days.

(21) Appl. No.: 13/938,832

(22) Filed: Jul. 10, 2013

(65) Prior Publication Data
US 2015/0015602 A1 Jan. 15, 2015

(51) Int. Cl.
*G06T 7/00* (2006.01)
(52) U.S. Cl.
CPC ............ *G06T 7/0004* (2013.01); *G06T 7/001* (2013.01); *G06T 7/0044* (2013.01); *G06T 2207/10028* (2013.01); *G06T 2207/20016* (2013.01); *G06T 2207/30164* (2013.01)
(58) Field of Classification Search
CPC ............... G06T 7/0002; G06T 7/0004; G06T 2207/10028
See application file for complete search history.

(56) References Cited

U.S. PATENT DOCUMENTS

| | | | | |
|---|---|---|---|---|
| 2002/0095267 A1* | 7/2002 | Knorpp | ................ | G01B 15/025 702/170 |
| 2006/0066469 A1* | 3/2006 | Foote | .................... | G01S 13/003 342/22 |
| 2010/0302247 A1* | 12/2010 | Perez | ................ | G06K 9/00201 345/440 |
| 2011/0200248 A1 | 8/2011 | Gerones et al. | | |
| 2012/0223937 A1* | 9/2012 | Bendall | ................ | G01B 11/24 345/419 |
| 2013/0144565 A1* | 6/2013 | Miller | ................... | G06T 17/00 703/1 |
| 2014/0278570 A1* | 9/2014 | Plummer et al. | ................ | 705/4 |

OTHER PUBLICATIONS

Provisional U.S. Appl. No. 61/799,452 of PG Pub 20140278570 filed Mar. 15, 2013.*
Besl, Paul J., et al., "A Method for Registration of 3-D Shapes," IEEE Transactions on Pattern Analysis and Machine Intelligence, vol. 14 No. 2, pp. 239-256 (Feb. 1992).
Feldmar, Jacques, et al., "Rigid, Affine, and Locally Affine Registration of Free-Form Surfaces", INRIA Rapport de Recherche No. 2220, 38 pages (1994).
Schwartz, J.T., et al., "Identification of Partially Obscured Objects in Two and Three Dimensions by Matching Noisy 'Characteristic curves'", International J. Robotics Research Technical Report 165, Robotics Report No. 46, (Jun. 1985).

* cited by examiner

*Primary Examiner* — Michelle L Sams
(74) *Attorney, Agent, or Firm* — Holland & Knight LLP; Mark H. Whittenberger, Esq.

(57) ABSTRACT

A computer-implemented method is provided. The method may include receiving or identifying a first point cloud associated with a train-time object or model. The method may further include selecting one or more probes associated with the first point cloud wherein selection of the one or more probes is based upon, at least in part, a score of a particular feature associated with the first point cloud. The method may also include analyzing a second point cloud associated with a run-time object, wherein the analysis is based upon the first point cloud. This analysis may produce an estimate of the difference in pose between the train time object and the run time object. Pose estimates may be obtained by matching points between the two point clouds based in part on features used during probe selection. Pose estimates may be scored, and refined, using the points selected as probes.

31 Claims, 6 Drawing Sheets
(4 of 6 Drawing Sheet(s) Filed in Color)

SYSTEM AND METHOD FOR SELECTIVE DETERMINATION OF POINT CLOUDS

TECHNICAL FIELD

This technology relates to machine vision systems and more specifically to a system for selective placement of probes associated with one or more point clouds.

BACKGROUND

Machine vision is used commonly to inspect manufactured objects, parts, printing and other physical items for visible flaws and defects. A variety of systems have been developed to perform such inspection, many of which contain a variety of advanced flaw-detection features and tools. Some machine vision systems may also include alignment capabilities (e.g. work piece alignment). One advanced inspection and alignment system is available under the Insight® product line from Cognex Corporation of Natick, Mass. Such systems can be trained with a model image of a desired part appearance, and employ advanced pattern recognition tools to compare the stored model image to the runtime image being inspected.

SUMMARY OF DISCLOSURE

In one implementation, a computer-implemented method is provided. The method may include receiving a first point cloud associated with the part to be located or inspected. This point cloud may be obtained directly from a 3D sensor, from a CAD or other solid model, or by preprocessing of range images, 2D images, or other images of the part. The method may further include selecting one or more probes associated with the first point cloud wherein selection of the one or more probes is based upon, at least in part, a score of a particular feature associated with the first image or model.

One or more of the following features can be included. The method may include analyzing a second point cloud associated with the object, wherein the analysis is based upon, at least in part, the probes and the first point cloud. The method may also include selecting one of more probes from the second point cloud based upon, at least in part, the one or more probes of the first point cloud. In some embodiments, the particular feature associated with the one or more probes includes a curvature. The first point cloud and the second point cloud may be three dimensional point clouds. In some embodiments, the method may include analyzing surface normal information associated with at least one of the first point cloud and the second point cloud. The method may further include determining a change in pose of the run-time object based upon, at least in part, the first point cloud and the second point cloud. The one or more points associated with the first point cloud may not correspond identically with one or more points associated with the second point cloud. In some embodiments, the particular feature associated with the one or more probes may include at least one of a curvature feature and a boundary feature. The method may further include mapping the one or more probes to a relative pose difference during a refinement stage.

In another implementation, a computer program product residing on a computer readable storage medium is provided. The computer program product can have a plurality of instructions stored thereon, which when executed by a processor, cause the processor to perform operations. Operations may include receiving a first point cloud associated with a train-time object or model. Operations may further include selecting one or more probes associated with the first point cloud wherein selection of the one or more probes is based upon, at least in part, a score of a particular feature associated with the first image or model.

One or more of the following features can be included. Operations may include analyzing a second point cloud associated with the object, wherein the analysis is based upon, at least in part, the probes and the first point cloud. Operations may also include selecting one of more probes from the second point cloud based upon, at least in part, the one or more probes of the first point cloud. In some embodiments, the particular feature associated with the one or more probes includes a curvature. The first point cloud and the second point cloud may be three dimensional point clouds. In some embodiments, operations may include analyzing surface normal information associated with at least one of the first point cloud and the second point cloud. Operations may further include determining a change in pose of the run-time object based upon, at least in part, the first point cloud and the second point cloud. The one or more points associated with the first point cloud may not correspond identically with one or more points associated with the second point cloud. In some embodiments, the particular feature associated with the one or more probes may include at least one of a curvature feature and a boundary feature. Operations may further include mapping the one or more probes to a relative pose difference during a refinement stage.

In another implementation, an imaging system having one or more processors is provided. The one or more processors can be configured to receive a first image or model associated with a train-time object and to identify a first point cloud associated with the first image or model. The one or more processors can be configured to select one or more probes associated with the first point cloud wherein selection of the one or more probes is based upon, at least in part, a score of a particular feature associated with the first image or model. The one or more processors can be configured to analyze a second point cloud associated with a run-time object, wherein the analysis is based upon, at least in part, the first point cloud.

One or more of the following features can be included. In some embodiments, the particular feature associated with the one or more probes includes one or more curvatures. The first point cloud and the second point cloud may be three dimensional point clouds. In some embodiments, the one or more processors can be configured to analyze surface normal information associated with at least one of the first point cloud and the second point cloud. The one or more processors can be configured to determine a change in pose of the run-time object based upon, at least in part, the first point cloud and the second point cloud. The one or more points associated with the first point cloud may not correspond identically with one or more points associated with the second point cloud. In some embodiments, the particular feature associated with the one or more probes may include at least one of a curvature feature and a boundary feature. The one or more processors can be configured to map the one or more probes to a relative pose difference during a refinement stage.

The details of one or more implementations are set forth in the accompanying drawings and the description below. Other features and advantages will become apparent from the description, the drawings, and the claims.

BRIEF DESCRIPTION OF THE DRAWINGS

The patent or application file contains at least one drawing executed in color. Copies of this patent or patent application

Like reference symbols in the various drawings can indicate like elements.

DETAILED DESCRIPTION OF THE EMBODIMENTS

System Overview

Figure 1:
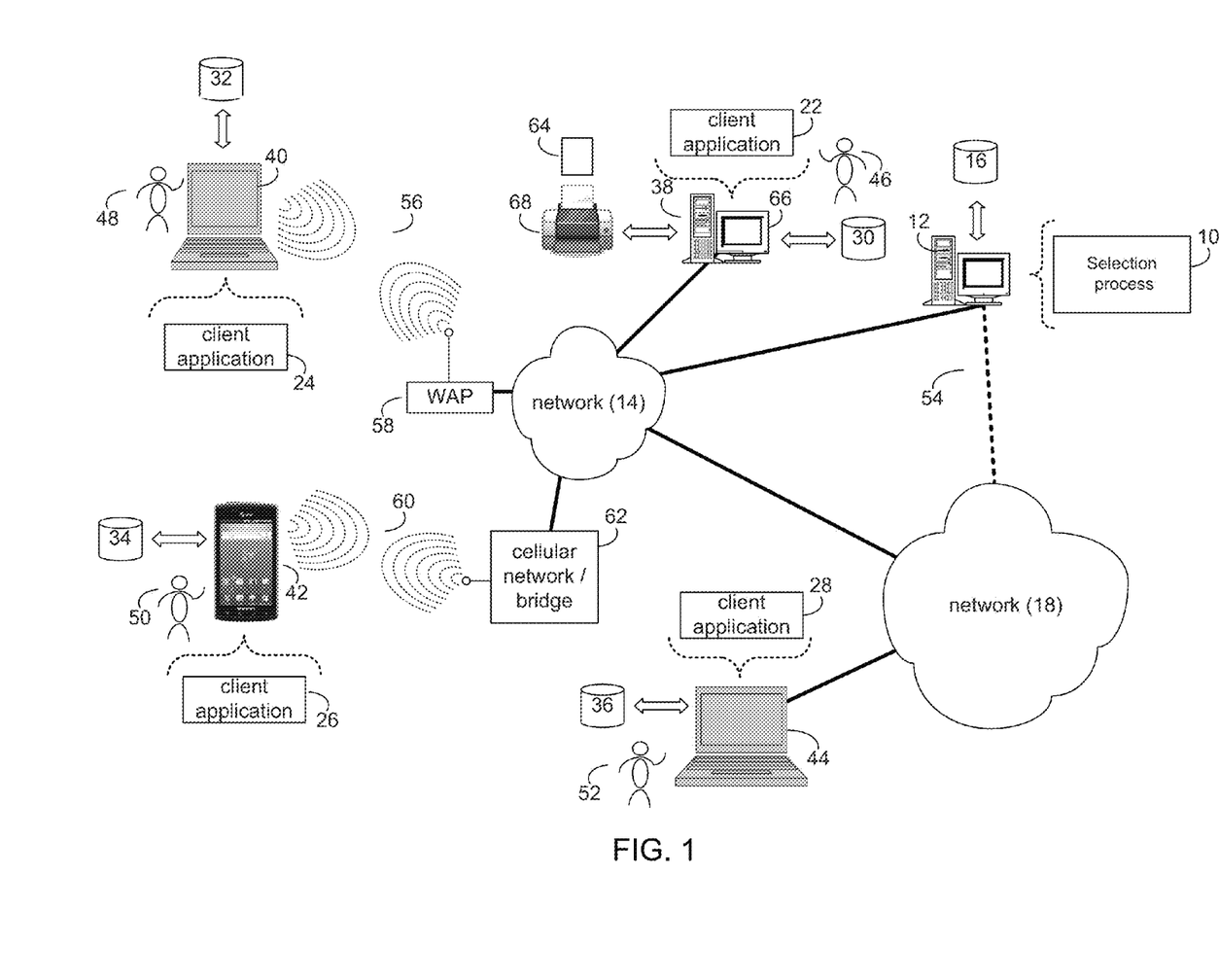
FIG. 1 is a diagrammatic view of an selection process coupled to a distributed computing network.

Referring to FIG. 1, there is shown selection process 10 that can reside on and can be executed by computer 12, which can be connected to network 14 (e.g., the Internet or a local area network). Examples of computer 12 can include but are not limited to a single server computer, a series of server computers, a single personal computer, a series of personal computers, a mini computer, a mainframe computer, or a computing cloud. The various components of computer 12 can execute one or more operating systems, examples of which can include but are not limited to: Microsoft Windows Server™; Novell Netware™; Redhat Linux™, Unix, or a custom operating system, for example.

The instruction sets and subroutines of selection process 10, which can be stored on storage device 16 coupled to computer 12, can be executed by one or more processors (not shown) and one or more memory architectures (not shown) included within computer 12. It should be noted that the one or more processors can be configured to process operations various operations simultaneously (e.g. when extracting or splitting of an image occurs as is discussed in further detail hereinbelow). Storage device 16 can include but is not limited to: a hard disk drive; a flash drive, a tape drive; an optical drive; a RAID array; a random access memory (RAM); and a read-only memory (ROM).

Network 14 can be connected to one or more secondary networks (e.g., network 18), examples of which can include but are not limited to: a local area network; a wide area network; or an intranet, for example.

Selection process 10 can be accessed via client applications 22, 24, 26, 28. Examples of client applications 22, 24, 26, 28 can include but are not limited to a standard web browser, a customized web browser, or a custom application. The instruction sets and subroutines of client applications 22, 24, 26, 28, which can be stored on storage devices 30, 32, 34, 36 (respectively) coupled to client electronic devices 38, 40, 42, 44 (respectively), can be executed by one or more processors (not shown) and one or more memory architectures (not shown) incorporated into client electronic devices 38, 40, 42, 44 (respectively).

Storage devices 30, 32, 34, 36 can include but are not limited to: hard disk drives; flash drives, tape drives; optical drives; RAID arrays; random access memories (RAM); and read-only memories (ROM). Examples of client electronic devices 38, 40, 42, 44 can include, but are not limited to, personal computer 38, laptop computer 40, smart phone 42, notebook computer 44, a server (not shown), a data-enabled, cellular telephone (not shown), and a dedicated network device (not shown).

One or more of client applications 22, 24, 26, 28 can be configured to effectuate some or all of the functionality of selection process 10. Accordingly, selection process 10 can be a purely server-side application, a purely client-side application, or a hybrid server-side/client-side application that is cooperatively executed by one or more of client applications 22, 24, 26, 28 and selection process 10.

Users 46, 48, 50, 52 can access computer 12 and selection process 10 directly through network 14 or through secondary network 18. Further, computer 12 can be connected to network 14 through secondary network 18, as illustrated with phantom link line 54.

The various client electronic devices can be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 can be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications can use Ethernet protocol and carrier sense multiple access with collision avoidance (i.e., CSMA/CA) for path sharing. The various 802.11x specifications can use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Client electronic devices 38, 40, 42, 44 can each execute an operating system, examples of which can include but are not limited to Apple iOS™, Microsoft Windows™, Android™, Redhat Linux™, or a custom operating system.

Figure 2:
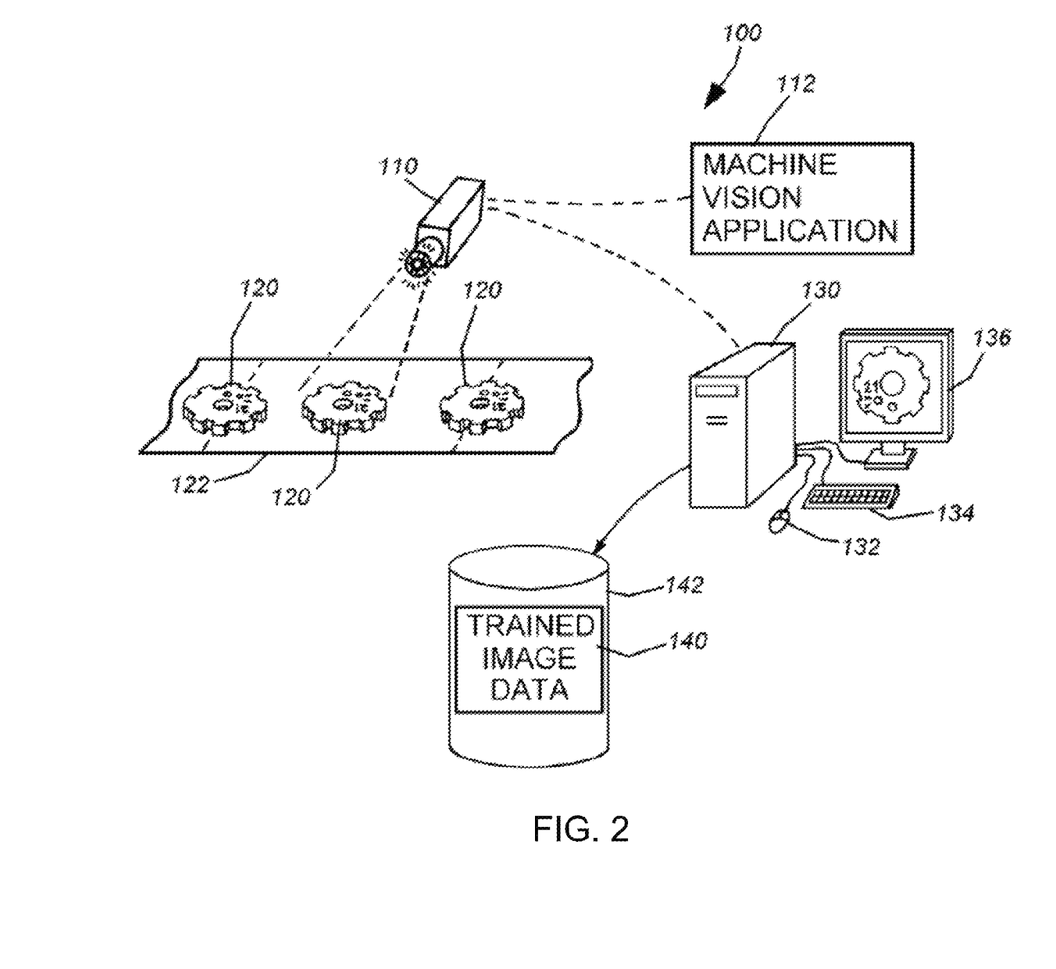
FIG. 2 is a system diagram corresponding to an embodiment of the selection process consistent with the teachings of the present disclosure.

Referring now to FIG. 2, an exemplary embodiment depicting a machine vision system 100 configured for use with selection process 10 is provided. It should be noted that a variety of system implementations can be employed in alternate embodiments without departing from the scope of the present disclosure. As will be described in further detail below, embodiments of selection process 10 described herein can be generally employed towards the selective placement of probes during a three-dimensional point cloud registration. For example, in some embodiments, aspects of the selection process can occur subsequent to the global positioning/registration of a live or runtime object image relative to a model or training image of the object, and prior to, during, or after inspection of the runtime object or feature.

In some embodiments, machine vision system 100 can include an imaging device 110, which can be a camera that includes an onboard processor (not shown) and a memory (not shown) capable of running a machine vision application 112. An example of an imaging device 110 that may be used with the present disclosure is the Cognex DS1100 3D Sensor, available from the Assignee of the present disclosure. Appropriate interfaces, alarms, and signals can be installed in, and/or connected to, camera imaging device 110 so that it is able to respond to a sensed fault detected during the inspection of an underlying object 120. In this embodiment, a conveyor 122 containing a plurality of objects (120) is shown. These objects can pass, in turn, within the predetermined field of view (FOV) of the imaging device 110 during an inspection process. As such, the imaging device 110 can acquire at least one image of each observed object 120.

In some embodiments, conventional microcomputer 130 can be any suitable computing device such as computer 12 shown in FIG. 1. Computer 130 can include graphical user interface components, such as a mouse 132, keyboard 134 and display 136. Other types of interfaces can also be employed, such as a Personal Digital Assistant (PDA) in alternate embodiments. In some embodiments, the imaging device 110 can be connected full-time to the computer 130, particularly where the computer performs the image processing functions. Additionally and/or alternatively, the processor in imaging devices, such as those of the Insight® product line, can allow for independent operation of the device free interconnection with a remote computer. In this embodiment, computer 130 can be connected to, and/or communicates with, the imaging device 110 for device-setup, testing, and analysis of runtime operation.

In some embodiments, data related to a model or training image 140 can be stored in connection with the computer 130 in disc storage 142, and can be stored in the onboard memory of the imaging device 110. This data can include data associated with selection process 10, which can be employed according to one or more embodiments of the present disclosure.

Figure 3:
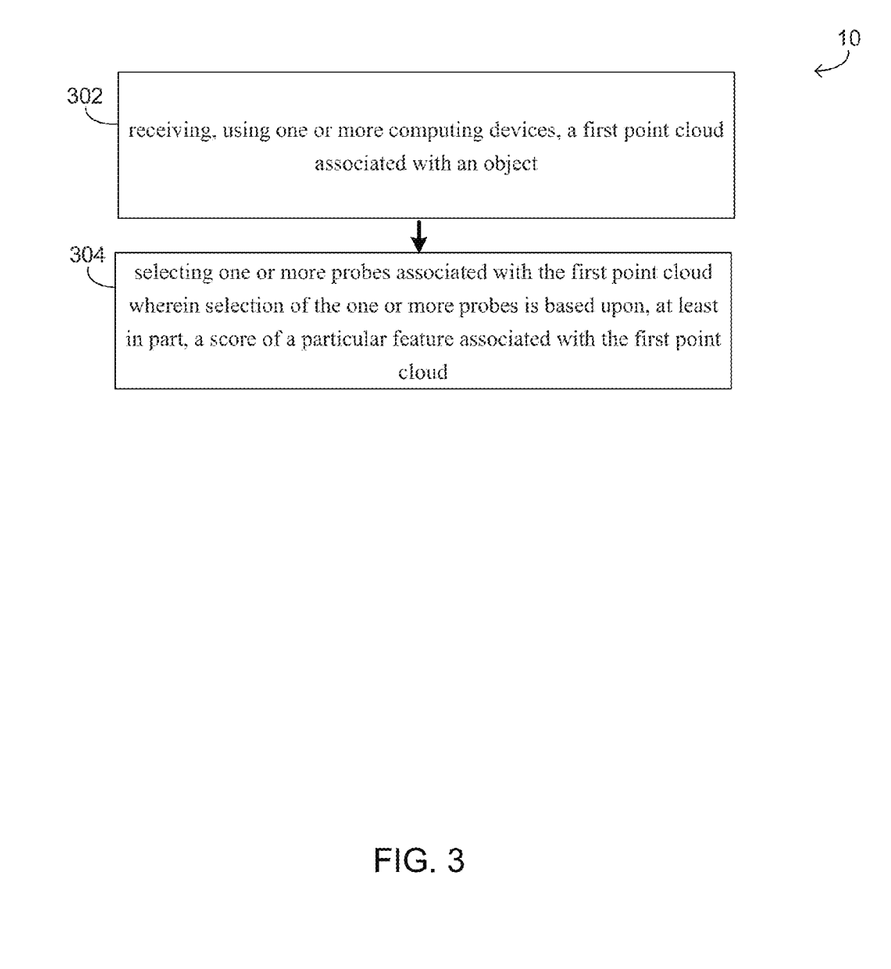
FIG. 3 is a flowchart depicting an embodiment of the selection process consistent with the teachings of the present disclosure.

Referring also to FIG. 3, selection process 10 can include receiving (302), using one or more computing devices, a first point cloud associated with an object. Selection process 10 may further include selecting (304) one or more probes associated with the first point cloud wherein selection of the one or more probes is based upon, at least in part, a score of a particular feature associated with the first point cloud.

Therefore, in some embodiments, one or more sensors may be configured to produce output that may be described as image data, which may then be transformed into point clouds. Additionally and/or alternatively, other sensors may produce point cloud data directly as their primary (or sole) output, and point clouds may also be derived from solid CAD models. Accordingly, any means of generating a point cloud may be used without departing from the scope of the present disclosure.

Embodiments of selection process 10 may be used in a variety of different applications, some of which may include, but are not limited to, part-picking in vision guided robotics (e.g. where the first point cloud is acquired at a known position during training and the pose estimate for the second cloud can be used to guide a robot gripper to the part at run time), three-dimensional inspection (e.g. where the first point cloud is acquired during training, using a known to be good "golden" template or exemplar, and the second can be compared meaningfully to that template after the estimated pose difference is removed), automotive kitting, molded plastic and cast metal volume inspection, and assembly inspection.

As discussed herein, in some embodiments selection process 10 may receive one or more point cloud inputs. The phrase "point cloud" as used herein, refers to a group of three dimensional points, on or near the surface of a solid object. These points may be presented in terms of their coordinates in a rectilinear or other coordinate system. Other information, such a mesh or grid structure indicating which points are neighbors on the object's surface, may optionally also be present. In some embodiments information about surface features including curvatures and surface normals, either derived from sensor measurements or computed previously, may be included in the input point clouds. However, this is merely provided by way of example as the selection process 10 does not require such an arrangement. In other embodiments this information will be absent from the input point clouds but will be computed as a preprocessing step prior to selection process 10. The term "probe" as used herein, may refer to a specific point taken from a point cloud being registered or to a point on or near the surface that point cloud represents, computed from the points and other data present in the cloud.

Embodiments disclosed herein are directed towards the selective placement of probes during a three-dimensional point cloud registration. Accordingly, in some embodiments selection process 10 described herein may be used to reduce the time required for the rigid registration of (surface) point clouds. For example, selection process 10 may receive one or more inputs such as two clouds of points drawn approximately from the surface of a particular object. The object may have been located at different positions when the two point clouds were acquired. Selection process 10 may be configured to determine the relative pose difference (e.g., change in position) of the object between the two point clouds in a finite amount of time. Accordingly, since point clouds contain so much data, alignment can be extremely slow. Embodiments of selection process 10 allow the user to run applications much faster, and may enable applications that wouldn't otherwise be possible at all. Embodiments of selection process 10 may additionally improve the accuracy of the determination of relative pose difference, or alter the nature of errors in the pose difference determination to make them more acceptable to users. Surface features which determine or limit the accuracy of relative pose estimation may be retained by the selection process 10 while other surface regions are eliminated.

For purposes of three dimensional registration, the point clouds given as input may generally correspond to different positions of the object, or objects, present. Such position changes may be represented in various ways, for example, by expressing the locations of all points in all clouds by values in a common coordinate system.

Selection process 10 allows for some amount of measurement error in the case of point clouds obtained from sensors, and for small inaccuracies in point clouds obtained from solid models.

In some embodiments, selection process 10 may receive two point clouds as inputs. One of these point clouds may be received during train-time, and the other during run-time. Accordingly, in this particular example, the two point clouds may correspond to the same object, except possibly for small differences in the object's surface, and may have significant but not necessarily complete overlap in the regions of the surface of that object that they represent. Additionally, more than one instance of the object present in the train-time point cloud may be present in the run-time point cloud, and other objects, not present in the train-time point cloud, may be present in the run-time point cloud.

Selection process 10 may be configured to enable determination of the change in pose of the object between the two point clouds in a finite amount of time. Using the teachings of the present disclosure, selection process 10 may be configured to enable determination of a solution even in instances when one or more points of the first input cloud do not correspond to one or more points in the second. In this way, it is only required that both clouds refer to points on the object's surface, not necessarily the same points on that surface. For example, for point clouds acquired by light-stripe sensors there is no requirement that the stripes of both point clouds coincide.

In some embodiments, selection process 10 operates by estimating local pose invariant features of the object's surface. The features used by selection process 10 may include, but are not limited to, Gaussian curvature, mean curvature, crease edges, and boundaries (e.g., occlusion edges). In this way, selection process 10 may be configured to remove from one or both point clouds all but the points which are most exceptional (e.g. high in estimated curvature) and least likely to be at or near an occlusion boundary. The filtering associated with selection process 10 may reduce the number of points and local regions used, and may use more informative point and regions, for three-dimensional point cloud matching. In some embodiments some of the selected points or probes may be used to compute relative pose estimates. In some embodiments the selected probes may be used to evaluate or score pose estimates, to enable selection of the best estimates or improvement of selected estimates.

Figure 4:
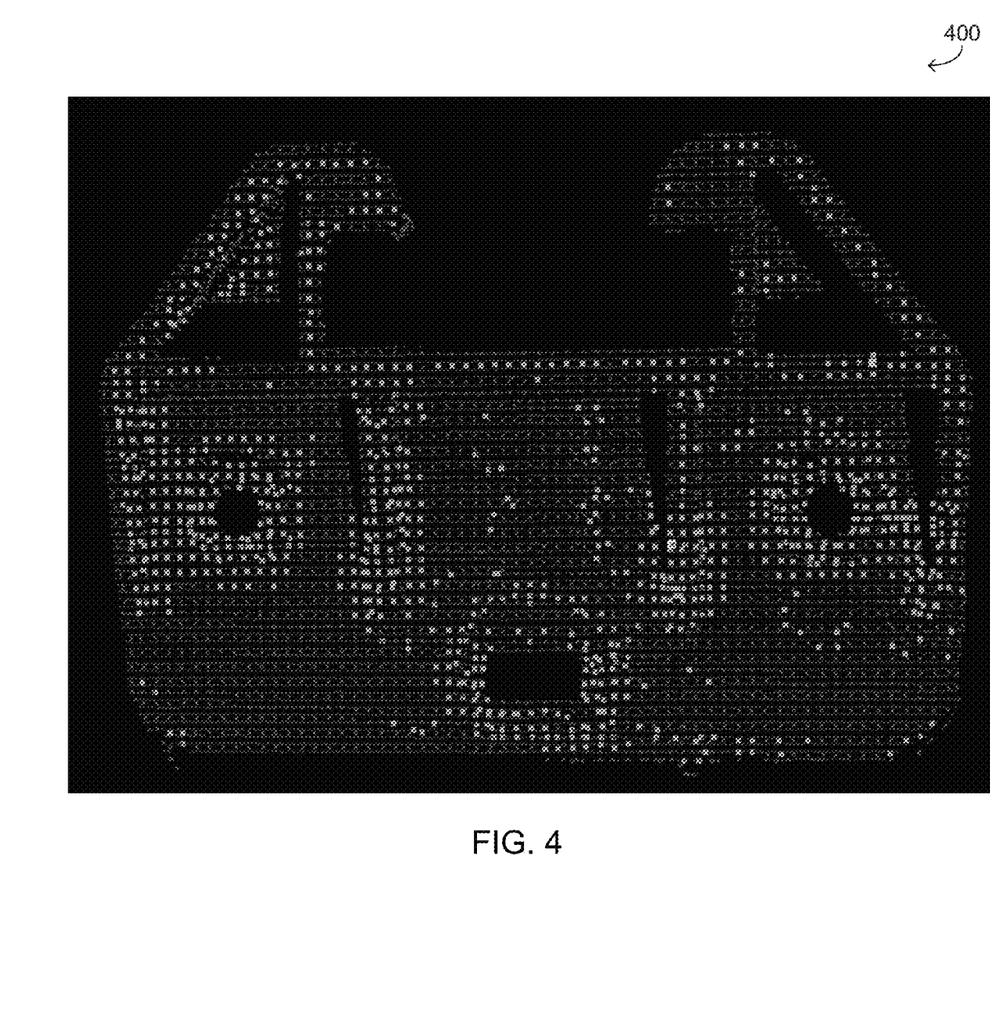
FIGS. 4-6 are diagrams showing images depicting train-time and run-time data associated with embodiments of selection process described herein.
Figure 5:
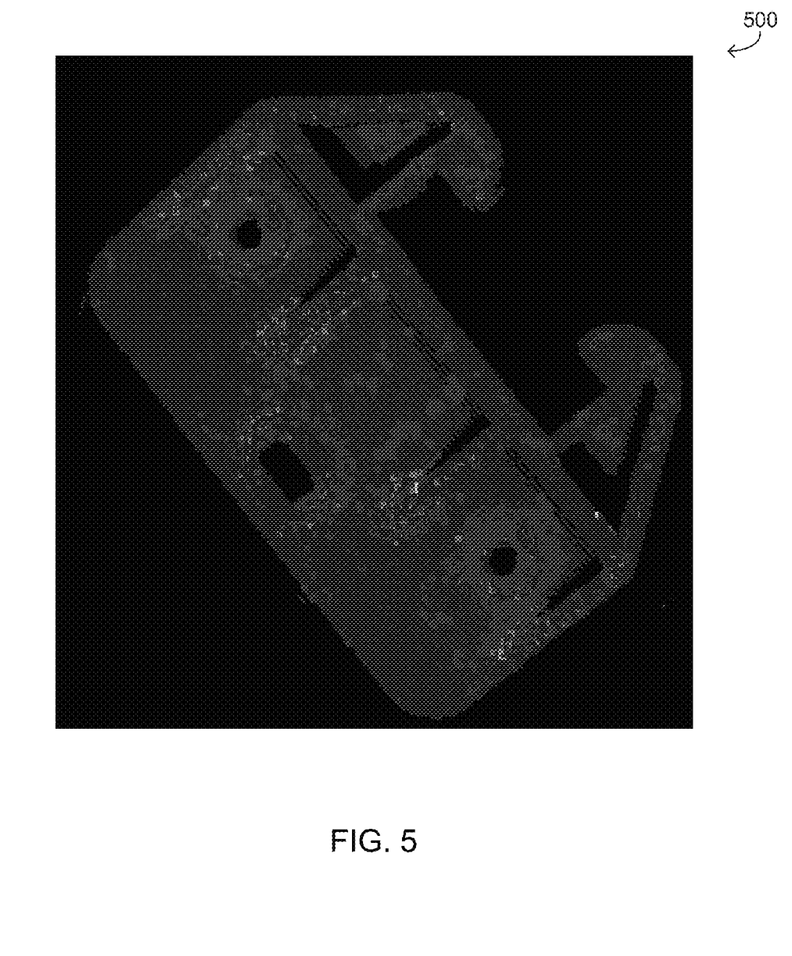
Figure 6:
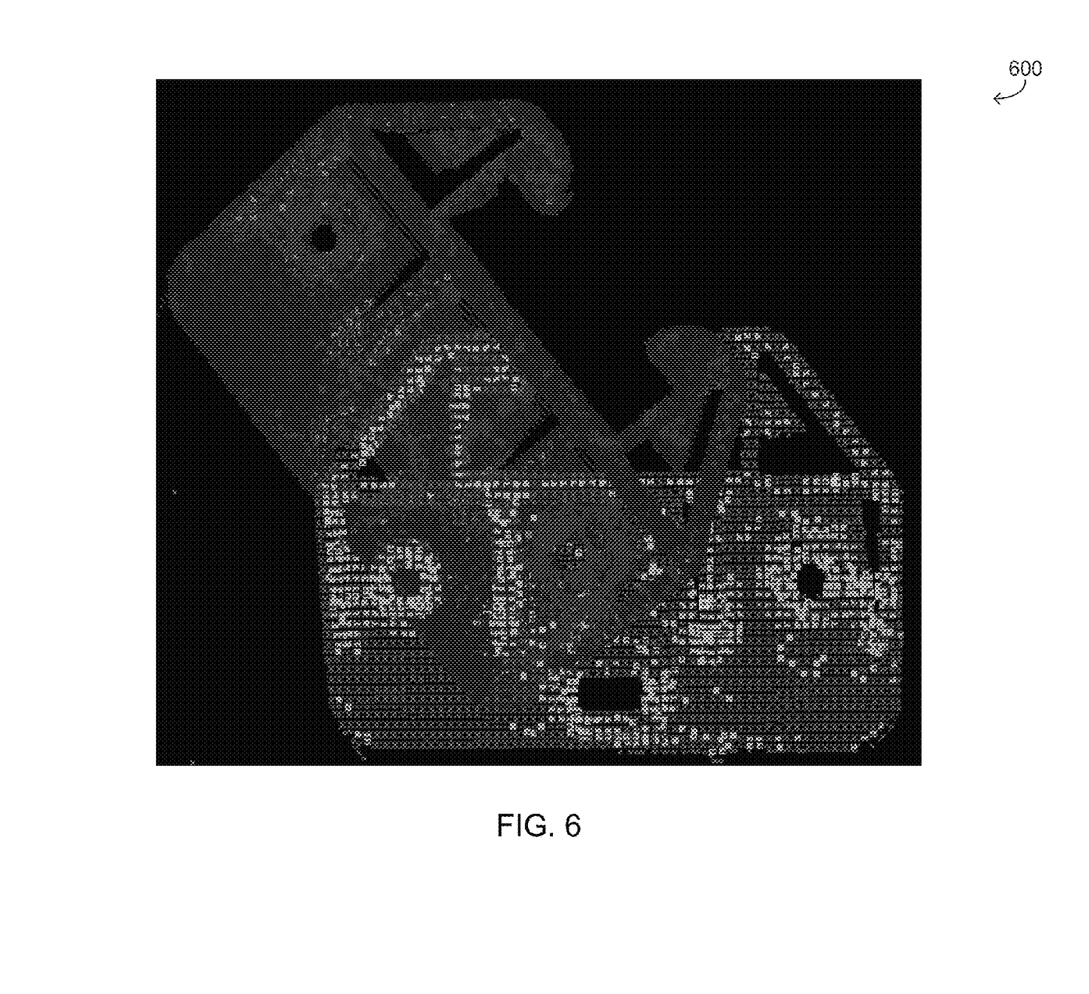

Referring now to FIGS. 4-6, embodiments 400-600 are provided depicting various images associated with various stages of selection process 10. The dots shown in green in FIG. 4 and FIG. 6 generally refer to train time data while the dots shown in red in FIG. 5 and FIG. 6 generally refer to run-time data. The dots shown in blue in FIG. 5 and FIG. 6 are a result of applying the final estimate of the relative pose difference to the train-time data. The smallest dots refer to original point clouds and larger dim dots refer to subsampled data while the larger brighter points (of varying color) indicate probes. These figures are discussed in further detail hereinbelow.

Referring again to FIG. 4, an embodiment 400 depicting an image associated with a train-time object is depicted. As discussed above, selection process 10 can include receiving, using one or more computing devices, a first image or other data associated with a train-time object and identifying a first point cloud associated with the first image.

Processing a point cloud may include downsampling the point cloud. The term "downsampling" as used herein may refer to its ordinary meaning in signal processing as well as to the removal of data points or replacement of groups of multiple points by single representative points. In some embodiments downsampling may be accomplished by subdividing a bounding box for the point cloud into voxels of a user-selected size, and replacing the points inside each voxel, if any, with a single point at their centroid. Selection process 10 may then compute surface features, including curvatures and surface normals, at one or more points associated with the downsampled point cloud. In some embodiments, this computation may be performed using only points from the downsampled cloud; in others points from the original point cloud may also be used to estimate features at the points of the downsampled cloud.

Embodiments of selection process 10 may include the use of one or more look-up-tables (LUTs). Accordingly, an LUT may be constructed for each point in the downsampled point cloud. In this way, selection process 10 may, for each point, determine all points that are within a fixed distance of the chosen point. In some embodiments, such a LUT may be implemented using a k-d tree algorithm.

Selection process 10 may include selecting one or more probes associated with the first point cloud wherein selection of the one or more probes is based upon, at least in part, a particular feature associated with the one or more probes. Some features may include, but are not limited to, curvature features, including Gaussian and mean curvature features and crease edge features, and boundary features such as occlusion edges. Some embodiments of selection process 10 may use LUT's such as previously described to find all points within a fixed distance of a potential probe. They may additionally fit planar or curved surfaces to such sets of points to estimate such features as Gaussian and mean curvatures, other measures of curvature, presence of a crease edge, and presence of an occlusion edge. Such features may be used to rank potential probes and to select only the highest ranking as probes. In some embodiments, a plane may be fit to the set of all points of the cloud within a fixed distance of a potential probe, to estimate the surface normal and tangent plane to the point cloud at that potential probe. A quadratic function may then be fit to the normal distances from that plane to the points within the fixed distance of the potential probe, and the curvatures of the corresponding quadratic surface may be used to estimate the Gaussian and mean curvature of the point cloud at the potential probe. For some embodiments, a fixed number or fraction of the points of the first point cloud may be chosen as probes. Points that are on occlusion edges may be excluded from consideration if desired. A potential probe point may be judged to be on an occlusion edge if the set of displacement directions to other points within the LUT's fixed distance, when projected into the plane fitted to the first point cloud at the potential probe point, avoids a sector subtending a sufficiently large angle on the circle of directions in that plane about the potential probe point. Remaining potential probe points may be given a score based on estimated curvatures, and the number of points requested having the best scores may be selected as probes. One example of such a score would be the squared difference of the estimated Gaussian curvature at the potential probe point and the maximum estimated Gaussian curvature of all points of the first cloud. Another would substitute mean for Gaussian curvature. Another would be the sum of these Gaussian and mean curvature scores. For all of these example scores, lower scores are ranked as better and the lowest scoring points would be chosen as probes.

Referring now to FIG. 5, an embodiment 500 depicting an image associated with a run-time object is depicted. In this way, a point cloud registration algorithm based on selection process 10 may further include analyzing a second point cloud associated with a run-time object, wherein the analysis is based upon, at least in part, the first point cloud. In this way, the second point cloud may be downsampled using the same or similar voxel grid processing as was used during the train-time analysis. Such a registration algorithm may further include performing a simplified, fast curvature analysis at every point. One or more LUTs may be constructed in a manner similar to that described above. Plane fitting and surface normal estimation may be done using a LUT to find all points within a fixed distance of a given point, as described for the first point cloud. Residual error from such a plane fit may be used as a the result of a fast curvature analysis, yielding a simple measure of curvature at every point of the second, possibly downsampled, cloud.

In some embodiments, selection process 10 may be used by a coarse registration algorithm that determines one or more candidate poses from non-collinear three-point correspondences. Any such correspondence mathematically determines a relative pose difference. As discussed above, the points associated with the first point cloud do not need to correspond identically with points associated with the second point cloud. Selection process 10 may be used to reduce the number of correspondences considered, by removing some pairs of points from consideration. In some embodiments, a three point correspondence may be established one point at a time. A point may be chosen from the second cloud, and one or more points then chosen from the first cloud may be paired with it in a one-point correspondence. For each such correspondence formed, a second point may be chosen from the second cloud, and one or more points may then be chosen from the first cloud to pair with it, extending it to one or more two-point correspondences. For each such two-point correspondence formed, a third point may be chosen from the second cloud, and then one or more points chosen from the first cloud, further extending each two point correspondence to one or more three-point correspondences. Points from the second cloud which are not ranked high in the simple measure of curvature may be excluded from consideration when beginning to determine a correspondence. Once a point has been selected from the second cloud, points from the first cloud that are not similar in features, as computed by selection process 10, may be eliminated from consideration in the formation of correspondences. Some or all of the remaining points from the first cloud may be chosen to generate candidate three-point correspondences in conjunction with the first point chosen from the second cloud. Similarly, once a first point has been chosen from each cloud, a second point may be chosen from the second cloud, at or near a fixed distance from the first point chosen from that cloud. To increase the speed with which points can be chosen, a second kind of LUT may be constructed, prior to beginning the process of generating three-point correspondences, which lists, for every point in a point cloud, all of the other points of that cloud which satisfy this distance constraint. The user may specify both the fixed distance used, and the allowable margin of distance error, or one or both of these values may be computed based on the downsampling voxel size and the estimated diameter of the first point cloud. In some embodiments these LUT's may be constructed with the aid of k-d trees or similar data structures. These LUT's may be constructed for both the first and the second point clouds. Once a second point has been chosen from the second point cloud, satisfying the distance constraint with respect to the first point from that cloud, one or more second points may be chosen from the first point cloud, satisfying the same distance constraint with respect to the first point chosen from the first point cloud. In addition to satisfying the distance constraint, points to be chosen from the first point cloud may be eliminated from consideration if they are not similar in some or all of the features computed by selection process 10 to the points chosen from the second point cloud. Once a second point has been chosen from each point cloud, a third point may be chosen from the second point cloud, at or near a fixed distance from each of the first two points chosen from the second cloud, and then one or more third points may be chosen from the first point cloud, also at or near that distance from each of the first two points chosen from the first cloud. This distance may be the same as that used in choosing the second points from both clouds. In some embodiments a third kind of LUT may be constructed for each point cloud, to facilitate choosing the third points. These LUT's may list, for every point in the cloud, and every other point of the cloud at or near a fixed distance from it, all other points in the cloud which are at or near that distance from both. Such an LUT may be constructed with the aid of a previously-constructed LUT of the second kind. In some embodiments curvature features may be used to eliminate points from consideration when establishing the first of three point correspondences, and surface normal direction features may be used when establishing the second. For example, after the first point has been chosen from the second cloud, features of the second cloud at that point such as Gaussian and mean curvature may be computed as for selection process 10. The points of the first cloud may be scored by the sum of the squares of the differences between their curvature features and the corresponding curvature features of the point selected from the second cloud, and all but some user-specified fraction with the best (that is, lowest) scores may be eliminated. Similarly, after a first and second point have been chosen from the second point cloud, and a first point from the first, the points from the first cloud satisfying the distance constraint may be scored by similarity in surface normal direction to the second point chosen from the second cloud, and all but the most similar points eliminated. To create a score which is meaningful despite the possible difference in pose between the two point clouds, for each cloud an orthonormal coordinate frame may be computed in which the first point chosen is at the origin, the line between the first and second points chosen is the X-axis, and the Y-axis is perpendicular to the X-axis and the surface normal at the first point. The direction cosines of the surface normal direction at the second point chosen to each of these three coordinate axes may be computed for each of the two clouds. The score may computed as the sum of the squares of the differences between the points chosen from the first and the second cloud of the corresponding direction cosines. Additional terms consisting of the squares of the differences between some or all of the curvature features at the second point chosen from each cloud may also be included in this score.

In some embodiments the three-point correspondence process may be repeated with different choices of points from the second cloud. These choices may be made with the aid of a random or pseudo-random number generator. The number of repetitions may be determined by the user, in order to increase the probability that at least one repetition generates a three-point correspondence which determines an at least approximately correct estimate of the pose difference between the first and second point cloud.

In some embodiments, selection process 10 and the correspondence-generation algorithm may be user-tunable. As such, the user may apply a sensitivity setting to one or more aspects of the process in order to increase or decrease their result sets.

In some embodiments, selection process 10 may be used in conjunction with a procedure to generate one or more candidate poses and to map the probes chosen by selection process 10 through the various candidate poses, in order to evaluate the quality of the candidate poses. For example, candidate poses may be computed from non-collinear three point correspondences, generated as described above. However, probes chosen by selection process 10 may be used to evaluate poses regardless of their method of generation. Each probe may be scored using a given candidate pose, whereas scoring may be avoided for points not selected as probes. The probe scores may be combined to generate a score for the candidate pose. In some embodiments the combination procedure may be summation, while the individual probe scores may be obtained by applying a non-linear function such as a hard or soft threshold to some measure of the distance of the image of the probe after mapping through the candidate pose to the second point cloud. In some embodiments this distance measure may be the Euclidean distance from the image of the probe to the nearest point of the second cloud. Alternatively, point-to-plane distances may be used, or approximated by computing the distance from the image of the probe to the nearest point in the convex hull of the set of all points of the second cloud within some preselected distance of the probe's image. The computation of the distance measure for probe scoring may be implemented approximately using one or more LUT's to reduce the run time needed In some embodiments these LUT's may be implemented using a k-d tree algorithm, an array containing precomputed values of the distance measure for possible probe image locations sampled from a volume enclosing the second point cloud, or both.

In some embodiments, selection process 10 may be used by a pose refinement algorithm. For example, variants of the well-known Iterated Closest Point (ICP) or Expectation-Maximization Iterated Closest Point (EMICP) algorithms may be used. In these algorithms a distance measure score such as those described above is summed over all points of the first point cloud, and the pose estimate is refined by adjusting it to decrease the sum of the scores over all points; this refinement process may then be repeated to further improve the pose estimate. Using selection process 10 it is possible instead to compute the scores only for the points selected as probes, and to adjust the pose estimate to decrease the sum over the probes, speeding up the refinement process.

In some embodiments, probes found by selection process 10 may be transferred from the point cloud on which they were found to another point cloud. In particular, probes may be transferred from the downsampled, first, train time point cloud to the downsampled, second, run time point cloud, or to the non-downsampled train time or run time point cloud. An individual probe may be transferred from one cloud to another by mapping it through the best available estimate of the pose difference between the clouds and then choosing the closest point on the cloud to which it is being transferred. LUT's such as constructed for pose scoring may be used to aid in the determination of the closest point. In this way, time need not be spent repeating the entire analysis of selection process 10 for the second point cloud. Optionally, some analysis may be done to remove probes that do not map to images sufficiently close to the second point cloud, or that map to points at or near occlusion edges. In some embodiments probes found at train time on a downsampled point cloud by selection process 10 may be transferred at run time, after selection of one or more high-quality candidate poses, and after an initial round of refinement of those poses based on downsampled train and run time point clouds, to a downsampled run time point cloud, using the pose estimate or estimates resulting from the initial refinement. An additional round of refinement may then be performed using a non-downsampled or partially downsampled train time point cloud. In this way LUT's which are used for pose refinement but which are time-consuming to create may be built at train time rather than at run time. As will be appreciated by one skilled in the art, the present disclosure can be embodied as a method, system, or computer program product. Accordingly, the present disclosure can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, the present disclosure can take the form of a computer program product on a computer-usable storage medium having computer-usable program code embodied in the medium.

Any suitable computer usable or computer readable medium can be utilized. The computer-usable or computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium can be any medium that can contain, store, communicate, propagate, or transport the program for use by or in connection with the instruction execution system, apparatus, or device. The computer-usable medium can include a propagated data signal with the computer-usable program code embodied therewith, either in baseband or as part of a carrier wave. The computer usable program code can be transmitted using any appropriate medium, including but not limited to the Internet, wireline, optical fiber cable, RF, etc.

Computer program code for carrying out operations of the present disclosure can be written in an object oriented programming language such as Java, Smalltalk, C++ or the like. However, the computer program code for carrying out operations of the present disclosure can also be written in conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through a local area network (LAN) or a wide area network (WAN), or the connection can be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions can also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving, from one or more computing devices configured for visually inspecting an object, image data associated with the object;
   transforming the image data associated with the object into a first point cloud;
   selecting one or more probes associated with the first point cloud wherein selection of the one or more probes is based upon, at least in part, a score of a particular feature associated with the first point cloud;
   analyzing a second point cloud associated with the object, wherein the analysis is based upon, at least in part, the probes and the first point cloud; and
   analyzing surface normal information associated with at least one of the first point cloud and the second point cloud.

2. The computer-implemented method of claim 1, wherein the particular feature associated with the one or more probes includes a crease edge feature.

3. The computer-implemented method of claim 1, further comprising:
   selecting one or more probes from the second point cloud based upon, at least in part, the one or more probes of the first point cloud.

4. The computer-implemented method of claim 1, wherein the particular feature associated with the one or more probes includes a measure of curvature.

5. The computer-implemented method of claim 1, wherein the particular feature associated with the one or more probes includes a mean curvature feature.

6. The computer-implemented method of claim 1, further comprising:
   determining a change in pose of the object based upon, at least in part, the first point cloud and the second point cloud.

7. The computer-implemented method of claim 1, wherein one or more points associated with the first point cloud does not correspond identically with one or more points associated with the second point cloud.

8. The computer-implemented method of claim 1, wherein the object is partially obscured in either or both point clouds, and wherein more than one instance of the object, and instances of other objects, are present in a point cloud.

9. The computer-implemented method of claim 1, wherein the particular feature associated with the one or more probes includes a Gaussian curvature feature.

10. The computer-implemented method of claim 1, further comprising:
    generating estimated pose differences between the object in the two point clouds by establishing correspondences between points of the two clouds, wherein the number of points used to form correspondences is reduced either by the use of the probes or the associated features.

11. The computer-implemented method of claim 1, further comprising:
    evaluating candidate pose differences between the object in the two point clouds by mapping the points selected as probes in the first point cloud via the candidate pose difference and computing the distances between the mapped images of the probes and points associated with the second cloud.

12. The computer-implemented method of claim 1, further comprising:

refining estimated pose differences between the object in the two point clouds by optimizing pose scores computed by mapping the points selected as probes in the first point cloud via the estimated pose difference and computing the distances between the mapped images of the probes and points associated with the second cloud.

13. A computer program product residing on a non-transitory computer readable storage medium having a plurality of instructions stored thereon, which when executed by a processor, cause the processor to perform operations comprising:
receiving, using one or more computing devices, image data associated with the object;
transforming the image data associated with the object into a first point cloud;
selecting one or more probes associated with the first point cloud wherein selection of the one or more probes is based upon, at least in part, a score of a particular feature associated with the first point cloud;
analyzing a second point cloud associated with the object, wherein the analysis is based upon, at least in part, the probes and the first point cloud; and
analyzing surface normal information associated with at least one of the first point cloud and the second point cloud.

14. The computer program product of claim 13, wherein the particular feature associated with the one or more probes includes a Gaussian curvature feature.

15. The computer program product of claim 13, further comprising:
selecting one or more probes from the second point cloud based upon, at least in part, the one or more probes of the first point cloud.

16. The computer program product of claim 13, wherein the particular feature associated with the one or more probes includes a measure of curvature.

17. The computer program product of claim 13, wherein the particular feature associated with the one or more probes includes a crease edge feature.

18. The computer program product of claim 13, further comprising:
determining a change in pose of the object based upon, at least in part, the first point cloud and the second point cloud.

19. The computer program product of claim 13, wherein one or more points associated with the first point cloud does not correspond identically with one or more points associated with the second point cloud.

20. The computer program product of claim 13, wherein the object is partially obscured in either or both point clouds, and wherein more than one instance of the object is present in a point cloud.

21. The computer program product of claim 13, wherein the particular feature associated with the one or more probes includes a mean curvature feature.

22. The computer program product of claim 13, further comprising:
generating estimated pose differences between the object in the two point clouds by establishing correspondences between points of the two clouds, wherein the number of points used to form correspondences is reduced either by the use of the probes or the associated features.

23. The computer program product of claim 13, further comprising:
evaluating candidate pose differences between the object in the two point clouds by mapping the points selected as probes in the first point cloud via the candidate pose difference and computing the distances between the mapped images of the probes and points associated with the second cloud.

24. The computer program product of claim 13, further comprising:
refining estimated pose differences between the object in the two point clouds by optimizing pose scores computed by mapping the points selected as probes in the first point cloud via the estimated pose difference and computing the distances between the mapped images of the probes and points associated with the second cloud.

25. A computer-implemented method comprising:
receiving, from one or more computing devices configured for visually inspecting an object, image data associated with the object;
transforming the image data associated with the object into a first point cloud;
selecting one or more probes associated with the first point cloud wherein selection of the one or more probes is based upon, at least in part, a score of a particular feature associated with the first point cloud;
analyzing a second point cloud associated with the object, wherein the analysis is based upon, at least in part, the probes and the first point cloud; and
determining a change in pose of the object based upon, at least in part, the first point cloud and the second point cloud.

26. A computer program product residing on a non-transitory computer readable storage medium having a plurality of instructions stored thereon, which when executed by a processor, cause the processor to perform operations comprising:
receiving, using one or more computing devices, image data associated with the object;
transforming the image data associated with the object into a first point cloud;
selecting one or more probes associated with the first point cloud wherein selection of the one or more probes is based upon, at least in part, a score of a particular feature associated with the first point cloud;
analyzing a second point cloud associated with the object, wherein the analysis is based upon, at least in part, the probes and the first point cloud; and
determining a change in pose of the object based upon, at least in part, the first point cloud and the second point cloud.

27. A machine vision system comprising:
one or more imaging devices comprised of one or more sensors configured to produce image data associated with an object;
a memory system; and
at least one processor configured to receive, from the one or more imaging devices, image data associated with the object, the at least one processor further configured to transform the image data associated with the object into a first point cloud, the at least one processor further configured to select one or more probes associated with the first point cloud, wherein selection of the one or more probes is based upon, at least in part, a score of a particular feature associated with the first point cloud, the at least one processor further configured to analyze a second point cloud associated with the object, wherein the analysis is based upon, at least in part, the probes and the first point cloud, the at least one processor further configured to determine a change in pose of the object based upon, at least in part, the first point cloud and the second point cloud.

28. The machine vision system of claim 27, wherein receiving image data continuously occurs during run-time.

29. The machine vision system of claim 27, the at least one processor further configured to guide a machine to the object at run-time based upon, at least in part, the first point cloud being acquired at a position known during training and the change in pose determined from the second point cloud.

30. The machine vision system of claim 27, the at least one processor further configured to inspect the object based upon, at least in part, a template point cloud being acquired from a template object during training, and comparing the template point cloud to the second point cloud of the object after the change in pose determined from the second point cloud has been removed.

31. The machine vision system of claim 28, wherein the at least one processor is further configured to select the one or more probes as the image data is being continuously received.

* * * * *